United States Patent [19]

Meermöller

[11] Patent Number: 4,605,040

[45] Date of Patent: Aug. 12, 1986

[54] VALVE THAT AUTOMATICALLY REGULATES AN OPERATING PARTIAL VACUUM IN MILKING SYSTEMS

[75] Inventor: Theodor Meermöller, Oelde, Fed. Rep. of Germany

[73] Assignee: Westfalia Separator AG, Oelde, Fed. Rep. of Germany

[21] Appl. No.: 599,400

[22] Filed: Apr. 12, 1984

[30] Foreign Application Priority Data

Apr. 15, 1983 [DE] Fed. Rep. of Germany ....... 3313645

[51] Int. Cl.⁴ .............................................. F16K 17/00
[52] U.S. Cl. .................................. 137/489; 119/14.44
[58] Field of Search .......... 137/489, DIG. 8, DIG. 9, 137/240; 119/14.44

[56] References Cited

U.S. PATENT DOCUMENTS 1,098,616  6/1914  Creveling ............................ 137/489

FOREIGN PATENT DOCUMENTS 1440901  6/1976  United Kingdom ......... 137/DIG. 8

Primary Examiner—Alan Cohan

Attorney, Agent, or Firm—Sprung, Horn, Kramer & Woods

[57] ABSTRACT

The partial-vacuum regulating valve consists of a main valve and an auxiliary valve. The auxiliary-valve body is adjusted in accordance with the partial vacuum prevailing in the milking system and affects the amount of air drawn out of the main-valve control chamber, which communicates with the atmosphere through a calibrated bore, through a certain channel. The partial vacuum that adjusts in the control chamber in accordance with the amount of air drawn out determines the position of the auxiliary-valve body and hence the amount of air flowing into a certain line through the air-inlet opening, which affects the partial pressure in the line. The main-valve control chamber has an additional calibrated air inlet that is closed off with a cap. When the cap is removed, atmospheric air also flows through the additional inlet into the main-valve control chamber and reduces the partial vacuum therein. The associated descent of the valve body reduces the air admitted into the line and hence leads to partial pressure in the milking system that is lower than the partial pressure established for the milking process by means of a screw and a spring.

4 Claims, 3 Drawing Figures

VALVE THAT AUTOMATICALLY REGULATES AN OPERATING PARTIAL VACUUM IN MILKING SYSTEMS

BACKGROUND OF THE INVENTION

The present invention relates to a valve that automatically regulates operating partial vacuum in milking systems, preferably with a main valve that admits atmospheric air into the partly vacuumized system and that has a control chamber subject to calibrated admission of air from the atmosphere and communicating with the control chamber of an auxiliary valve through a choke point that can be blocked by the auxiliary valve, whereby the auxiliary-valve control chamber communicates with a series of lines that supplies the operating partial vacuum.

A valve of this type is known, for example, from German Patent No. 2 363 125. With it, the desired operating partial vacuum can be established by varying the prestress of a spring. Since the operating partial vacuum in milking systems must conform to standards that have been established for the dairy industry, it must be adjusted by an expert when the system goes into initial operation. The level of operating partial vacuum must not be altered by the operator of the milking system to prevent possible detriment to the operation of the system and to the health of the animals. Once the level has been set it must accordingly not even be varied while the milking system is being rinsed out. The effectiveness of the rinsing process depends, however, on the speed at which the rinsing solution travels through the system and hence on the level of partial vacuum. It would therefore be desirable to use a higher vacuum during the rinsing process.

Operations have accordingly been conducted to some extent with two regulating valves, one set at the partial vacuum employed during the milking process and the other at the more powerful partial vacuum employed to rinse the system out. Switching from one valve to the other can be either manual or automatic. The expense of installing the system is, however, considerably increased by the second valve.

SUMMARY OF THE INVENTION

The object of the present invention is to provide a valve that automatically regulates operating partial vacuum in milking systems and that is simple to shift over to the more powerful partial vacuum necessary for the rinsing process without altering the operating partial vacuum that has been established for the milking process.

This object is attained in accordance with the invention in that the main-valve control chamber has an additional calibrated air inlet that can be blocked off.

The object can also be attained in that the auxiliary-valve control chamber has a calibrated air inlet that can be blocked off.

The additional air inlet into the main-valve control chamber can be opened to reduce the partial vacuum in the chamber. Simultaneously choking off of the supply of atmospheric air into the partly vacuumized system augments the partial vaccuum in the system.

Admitting atmospheric air to the auxiliary-valve control chamber leads to a reduction in the partial vacuum within that chamber and hence to the choking off of the connection between the two control chambers. Hence, less air is withdrawn from the main-valve control chamber and the partial vacuum prevailing therein will also be reduced with the aforesaid result.

Some preferred embodiments of the invention will now be described with reference to the attached drawings, wherein

DETAILED DESCRIPTION OF THE PREFERRED EMBODIMENTS

Figure 1:
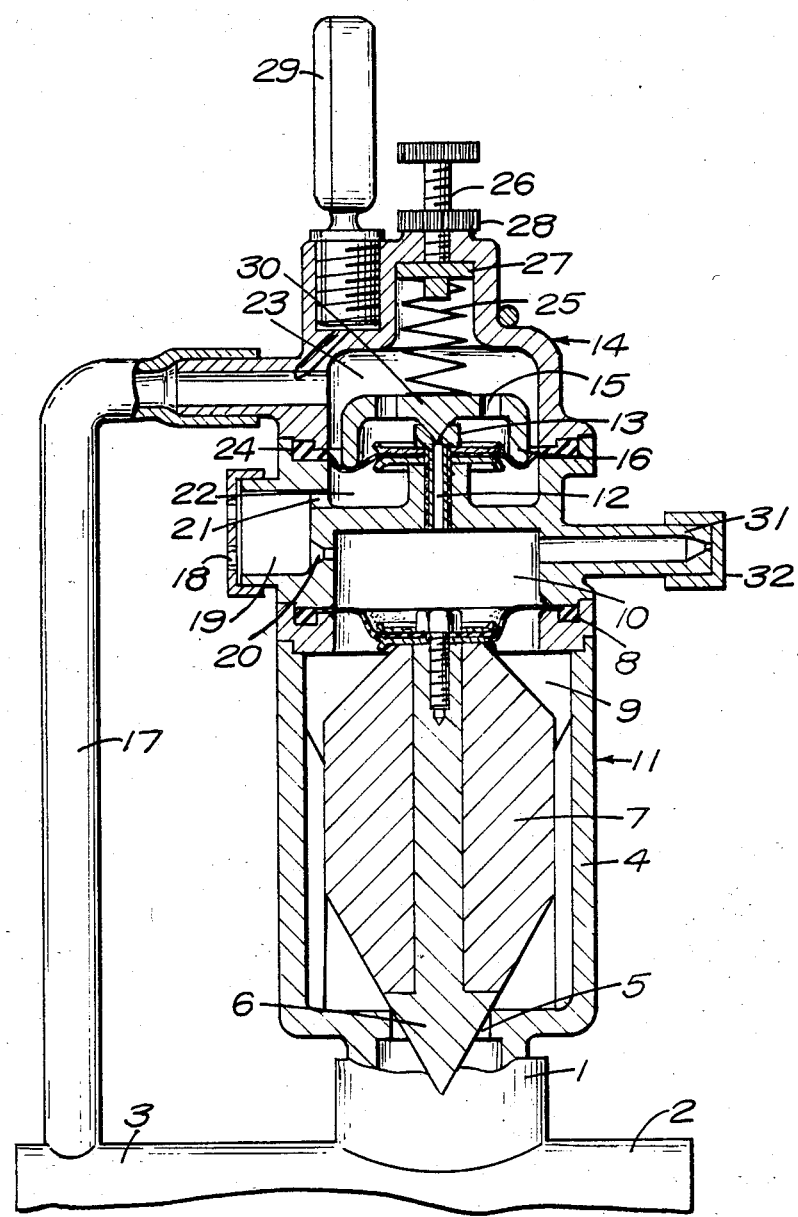
FIG. 1 illustrates a partial-vacuum regulating valve in accordance with the invention with an additional air inlet into the main-valve control chamber.

FIG. 1 illustrates a partially vacuumized line 1 with one part 2 that leads to a vacuum pump and another part 3 that leads to equipment, which consists of the directly connected pulsators and the indirectly connected milking machines. The bottom of a valve housing 4 with a air-inlet opening 5 is tightly screwed to partially vacuumized line 1. The valve body 6 that governs air-inlet opening 5 supports a valve load 7 and communicates with the diaphragm 8 of the actual control valve. A chamber 9 communicates with the ambient air. The control chamber 10 of a main valve 11 communicates during operation with part 3 of partially vacuumized line 1 through a channel 12, the choke point 13 of an auxiliary valve 14, the bores 15 in a cap 16, and a line 17.

Atmospheric air enters a chamber 19 through an air filter 18. Chamber 19 communicates with control chamber 10 through one or more calibrated bores 20. Chamber 19 also communicates with a chamber 22 in auxiliary valve 14 through larger bore 21, so that the complete atmospheric pressure will always prevail in that chamber. Auxiliary-valve control chamber 23 communicates with part 3, which is subject to the prevailing operating partial vacuum. Cap 16, which rests on the diaphragm 24 of auxiliary valve 14, is loaded in the closure direction by a spring 25, the tension of which is adjusted by a screw 26 and a spring plate 27 and which is held in that state by a knurled nut 28, which also establishes the desired operating partial vacuum. There is a vacuum gauge 29 disposed in the auxiliary valve housing. Auxiliary valve 14 has a valve body 30. Control chamber 10 has an additional calibrated air inlet 31 sealed off by means of a cap 32.

The function of the valve will now be described.

When the milking system is not being operated, atmospheric pressure prevails in chambers 9, 10, 22, and 23. Valve bodies 6 and 30 rest on their seats subject to valve load 7 or spring 25, which act in the closure sense. When the vacuum pump is turned on with no equipment connected, full operating partial vacuum will occur in lines 1, 2, and 3 and, through line 17, in auxiliary-valve control chamber 23. Diaphragm 24 which is also subject to atmospheric air from below, raises cap 16 against the force of the spring 25 until the desired operating partial vacuum is attained. Air is simulataneously drawn out of main-valve control chamber 10 through channel 12, bores 15, and line 17. Atmospheric air simultaneously flows through calibrated bore 20 into control chamber 10, in which a control partial vacuum that is lower than operating partial vacuum accordingly occurs. If the system is connected to equipment, the operating partial vacuum will be slightly reduced and auxiliary-valve body 30 will be more powerfully choked by spring 25. The control partial vacuum in control chamber 10 will also be slightly reduced and main valve 11 accordingly further closed.

Before rinsing commences, cap 32 is removed from air inlet 31, allowing atmospheric air to flow into control chamber 10 and reducing the partial vacuum prevailing therein. Valve body 6 will accordingly drop and close air-inlet opening 5 increasing the partial vacuum in line 1. After the system has been rinsed out, cap 32 is replaced on air inlet 31, reestablishing the operating partial vacuum for milking.

Figure 2:
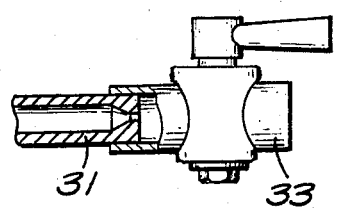
FIG. 2 illustrates the air inlet of FIG. 1 as employed in conjunction with a manually operated stopcock.

FIG. 2 illustrates how a manual stopcock 33 can be employed instead of cap 32, further simplifying the process.

Figure 3:
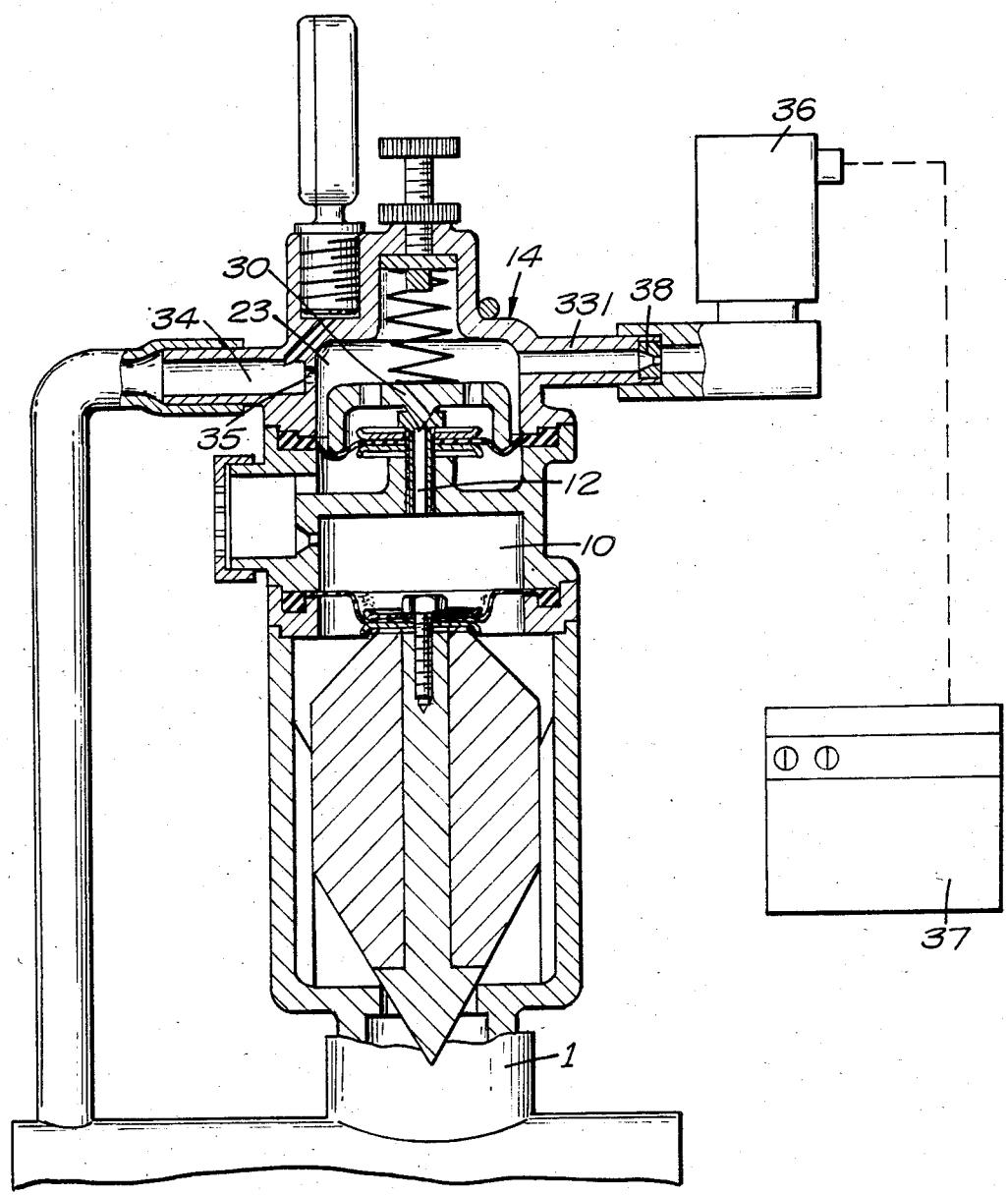
FIG. 3 illustrates a partial-vacuum regulating valve in accordance with the invention with an additional air inlet into the auxiliary-valve control chamber.

The air inlet 331 in FIG. 3 communicates with the control chamber 23 of auxiliary valve 14. Admitting atmospheric air reduces the operating partial vacuum in control chamber 23 and hence lowers valve body 30 in conjuction with increased choking of channel 12. This also reduces the operating partial vacuum in control chamber 10 and hence increases the partial vacuum in line 1. A partial-vacuum connection 34 to control chamber 23 has a calibrated bore 35 for obtaining sufficient partial-vacuum reduction. A remotely controlled automatic valve 36 is employed instead of a cap to open air inlet 331. Valve 36 is opened by an automatic flushing mechanism 37 at the commencement of the rinsing process to prevent the system from being mis-operated. Air inlet 331 can also have an exchangeable nozzle 38 that contains the calibrated bore to allow the partial vacuum to be easily adjusted as desired to the given dimensions of each individual system. Adjustment can also be carried out by means of a needle valve, not illustrated, provided to supplement the potential for blocking air inlet 331.

It will be appreciated that the instant specification and claims are set forth by way of illustration and not limitation, and that various modifications and changes may be made without departing from the spirit and scope of the present invention.

Specifically the invention is not limited to the preferred servocontrolled partial-vacuum regulating valve with a main and an auxiliary valve that has just been described but can be employed to equal effect by simple partial-vacuum regulating valves with a diaphragm that are not servocontrolled.

What is claimed is:

1. In a valve for automatically regulating the operating partial vacuum in a milkin system with automatic flushing means, having a main valve for admitting atmospheric air into the partially vacuumized system and including a control chamber receptive of a calibrated admission of air from the atmosphere valve including a control chamber in communication with the control chamber of the main valve through choke point blockable by the auxiliary valve, and wherein the auxiliary-valve control chamber is communicatable with means for supplying the operating partial vacuum, the improvement comprising: means forming an additional calibrated air inlet for the main-valve control chamber and which communicates with the atmosphere and means for selectively unblocking and blocking off the additional air inlet comprising a remotely controlled automatic valve and wherein the automatic valve is automatically shifted by the automatic flushing means when rinsing is initiated, whereby a different partial vacuum pressure can be obtained without altering the opening partial vacuum.

2. The partial-vacuum regulating valve as in claim 1, wherein the means forming the air inlet includes an exchangeable nozzle.

3. In a valve for automatically regulating the operating partial vacuum in a milking system with automatic flushing means, having a main valve for admitting atmospheric air into the partially vacuumized system and including a control chamber receptive of a calibrated admission of air from the atmosphere and an auxiliary valve including a control chamber in communication with the control chamber of the main valve through a choke point blockable by the auxiliary valve, and wherein the auxiliary-valve control chamber is communicatable with means for supplying the operating partial vacuum, the improvement comprising means forming a calibrated air inlet for the auxiliary-valve control chamber and which communicates with the atmosphere and means for selectively unblocking and blocking off the air inlet to the auxiliary valve control chamber comprising a remotely controlled automatic valve and wherein the automatic valve is automatically shifted by the automatic flushing means when rinsing is initiated, whereby a different partial vacuum pressure can be obtained without altering the opening partial vacuum.

4. The partial-vacuum regulating valve as in claim 3, wherein the means forming the air inlet includes an exchangeable nozzle.

* * * * *